US011841083B2

(12) United States Patent
Doyle (10) Patent No.: US 11,841,083 B2
(45) Date of Patent: Dec. 12, 2023

(54) RADIAL PRESSURE ADJUSTABLE GLAND SEALING SYSTEM

(71) Applicant: Roger Doyle, Parmelia (AU)

(72) Inventor: Roger Doyle, Parmelia (AU)

(*) Notice: Subject to any disclaimer, the term of this patent is extended or adjusted under 35 U.S.C. 154(b) by 42 days.

(21) Appl. No.: 17/434,432

(22) PCT Filed: Feb. 27, 2020

(86) PCT No.: PCT/AU2020/050180
§ 371 (c)(1),
(2) Date: Aug. 27, 2021

(87) PCT Pub. No.: WO2020/172718
PCT Pub. Date: Sep. 3, 2020

(65) Prior Publication Data
US 2022/0136605 A1 May 5, 2022

(30) Foreign Application Priority Data
Feb. 27, 2019 (AU) ................ 2019900635

(51) Int. Cl.
*F16J 15/46* (2006.01)
*F16J 15/18* (2006.01)

(52) U.S. Cl.
CPC ............ *F16J 15/46* (2013.01); *F16J 15/184* (2013.01); *F16J 15/185* (2013.01)

(58) Field of Classification Search
CPC ......... F16J 15/184; F16J 15/185; F16J 15/24; F16J 15/46
See application file for complete search history.

(56) References Cited

U.S. PATENT DOCUMENTS 943,023 A * 12/1909 Johnson ............... F16J 15/20
285/97
3,121,570 A 2/1964 Gilbert
(Continued)

FOREIGN PATENT DOCUMENTS

EP 1231445 A1 8/2002
GB 192867 A * 2/1923
(Continued)

OTHER PUBLICATIONS

PCT International Search Report and Written Opinion. PCT/AU2020/050180, dated May 12, 2020.

*Primary Examiner* — Nicholas L Foster
(74) *Attorney, Agent, or Firm* — Forsgren Fisher McCalmont DeMarea Tysver LLP; James M. Urzedowski; Daniel A. Tysver (57) ABSTRACT

A radial pressure adjustable gland sealing system is disclosed herein. The system includes at least one inflatable bladder operable to surround a rotating shaft or sleeve of a rotating shaft, and at least one inflating tube. One end of each inflating tube is in fluid communication with the internal envelope of one of the at least one inflatable annular bladder. An opposite end of each inflating tube is connected, or extends, to a location outside of a static housing in which the rotating shaft is housed, such that the level of inflation of each inflatable bladder can be adjusted by way of its respective inflating tube, and thereby adjust the level of radial pressure exerted on the rotating shaft or sleeve for a rotating shaft.

10 Claims, 8 Drawing Sheets

(56) References Cited

U.S. PATENT DOCUMENTS

| | | | | |
|---|---|---|---|---|
| 3,226,126 A | * | 12/1965 | Plate | F16J 15/20 |
| | | | | 277/540 |
| 3,338,583 A | * | 8/1967 | Isdale | F16J 15/46 |
| | | | | 251/172 |
| 3,471,156 A | | 10/1969 | Burns | |
| 3,628,798 A | | 12/1971 | Mehlhope | |
| 4,194,746 A | * | 3/1980 | Stevens | F16J 15/24 |
| | | | | 277/516 |
| 2003/0151209 A1 | * | 8/2003 | Schmid | F16J 15/185 |
| | | | | 277/944 |
| 2009/0189353 A1 | * | 7/2009 | Stokkan | F16J 15/46 |
| | | | | 277/334 |
| 2015/0239726 A1 | * | 8/2015 | Bischel | F16J 15/3236 |
| | | | | 277/300 |
| 2018/0156208 A1 | * | 6/2018 | Mahieux | F04B 53/02 |

FOREIGN PATENT DOCUMENTS

| | | |
|---|---|---|
| GB | 2403708 A | 1/2005 |
| WO | WO9218195 | 10/1992 |

* cited by examiner

RADIAL PRESSURE ADJUSTABLE GLAND SEALING SYSTEM

FIELD OF THE INVENTION

The invention relates to a radial pressure adjustable gland sealing system. The invention is particularly directed to gland sealing systems for use with mining and/or industrial pumps where the amount of radial pressure applied by the gland sealing system is adjusted externally, but may be used in any situation involving the sealing of a rotating shaft.

BACKGROUND TO THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

Any rotating shaft that passes through a wall of a pressurised vessel requires a seal to minimise, if not prevent, the loss of pressure and, thus, the contents of the vessel. A common sealing method is the use of fibrous packing between the static enclosure and the rotating shaft or shaft sleeve of slurry pumps. Such an arrangement is commonly known as a packed gland seal or gland packing.

Gland packing, as a method of sealing, typically involves a series of packing rings that are compressed against the shaft or the shaft sleeve. To dissipate the heat generated by friction during rotation of the shaft or shaft sleeve, fluid is directed into the narrow gap formed between the gland packing and the shaft/shaft sleeve. This fluid also operates to counter the flow into the seal area of the pressurised contents of the vessel from which fluid is being pumped.

Figure 1:
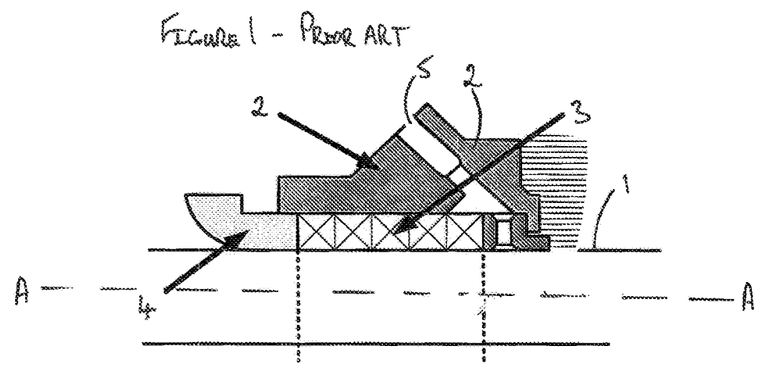
FIG. 1 is a cross-sectional schematic of a packing gland arrangement of the prior art.

A typical prior art packed gland arrangement for a pump is shown in FIG. 1.

As shown in FIG. 1, a pump shaft sleeve 1 is surrounded by a stuffing box 2. Gland packing 3 is then installed about the pump shaft sleeve 1 such that it is tightly restrained in the space between the pump shaft sleeve 1 and stuffing box 2. A gland follower 4 is also inserted into the space between the pump shaft sleeve 1 and stuffing box 2 to longitudinally contain the gland packing 3. The gland follower 4 also operates to provide longitudinal pressure against the gland packing 3.

An outlet 5 in the stuffing box 2 allows gland water or grease (not shown) to enter the stuffing box 2 and flow through to the gland packing 3. In this manner the gland water acts to dissipate the heat generated by the friction created between the static gland packing 3 and the rotating shaft sleeve 1. The presence of the gland water or grease also operates to counter the flow of the pressurised contents of the pump into the seal area and thereby prevent contaminants from causing damage to the pump shaft sleeve 1 and gland packing 3.

A key problem with this arrangement, however, is that following installation of the gland packing 3, the only way to adjust the radial pressure applied by the gland packing 3 against the pump shaft sleeve 1 is by adjusting the longitudinal pressure applied to the gland packing 3 by way of the gland follower 4. To elaborate, applying force to the gland packing 3 in a direction parallel to pump shaft axis A-A causes each gland packing 3 to be squeezed relative to its adjacent gland packing 3 and thereby deform in the radial direction.

While it is theoretically possible to adjust radial pressure in this manner to the desired level of radial pressure, to do so involves overcoming two issues:

Firstly, it is typically the case that the level of radial pressure applied by the deformed packed glands 3 is not constant either between the rings of packing 3 or even between points of contact with the pump shaft sleeve 1 within the same packed gland 3. This issue is further exacerbated by the fact that the pressure applied by the gland follower 4 diminishes with increased distance, reducing the radial deformation of the packing glands 3 in the most crucial performance area;

Secondly, adjusting the radial pressure by way of the gland follower 4 is best done while the pump is running. However, safety requirements dictate that all rotating shafts must be guarded while in motion. The end result is that in most situations the operator removes the guard to manipulate the gland follower 4 while the pump is running, so as to achieve the desired radial pressure adjustments.

It is therefore an object of the present invention to provide a gland sealing system offering a different method for adjusting the radial pressure applied thereby.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In accordance with a first aspect of the present invention there is a radial pressure adjustable gland sealing system comprising:

at least one inflatable bladder operable to surround a rotating shaft or sleeve of a rotating shaft;

at least one inflating tube, one end of each inflating tube being in fluid communication with the internal envelope of one of the at least one inflatable annular bladder;

where an opposite end of each inflating tube is connected, or extends, to a location outside of a static housing in which the rotating shaft is housed, such that the level of inflation of each inflatable bladder can be adjusted by way of its respective inflating tube and thereby adjust the level of radial pressure exerted on the rotating shaft or sleeve of a rotating shaft.

In a preferred arrangement, the system further includes a gland follower having at least one aperture provided therein, each inflating tube operable to connect to one of the at least one apertures or extend therethrough.

In an alternative configuration, each inflating tube extends through conduits in the static housing required for the normal operation of the pump. Alternatively, conduits may be specifically created in the static housing to facilitate the inflating tubes.

Preferably the inflatable bladder is annular in shape. However, in an alternate configuration, the inflatable bladder may be helical in shape.

In one variation of this aspect of the invention, one inflatable bladder comprises a first annular bladder segment and a second annular bladder segment, the first and second annular bladder segment connected by a bridging tube and where following inflation of the first annular bladder segment, fluid travels along the bridging tube to inflate the second annular bladder segment.

Preferably, a gland seal may incorporate a plurality of rods, the plurality of rods connected to at least one inflatable bladder such that the rod is axially aligned with a central longitudinal axis of a rotating shaft about which the gland seal is installed. The plurality of rods may be sewn to the at least one inflatable bladder.

The position of the aperture may be used to indicate the inflatable bladder to which it is connected by way of the attached inflating tube. Alternatively, or conjunctively, the indication of the inflatable bladder to which an aperture is connected by way of an inflating tube may be provided by way of one or more of the following: colour coding; descriptive labels.

In a configuration incorporating a helical shaped inflatable bladder, the system may further incorporate a gland water distribution ring having a sloped internal face and the gland follower may also have a sloped internal face. In such an arrangement, the sloped internal face of the gland water distribution ring is complimentary to the sloped internal face of the gland follower and complimentary to the pitch angle of each coil of the inflatable bladder.

The helical shaped inflatable bladder may be contained within a fibrous sleeve.

The helical shaped inflatable bladder may have an open end, being opposite the end which transitions into the inflating tube. In such a configuration, a gland water distribution ring may be provided with a terminating recess, the terminating recess operable to receive the open end and thereby seal the helical shaped inflatable bladder.

Each aperture may be configured so as to allow for sealing engagement with a nozzle of a grease gun.

An internal hollow nipple arrangement may surround each aperture and project from one side of the gland follower towards the annular bladders, each hollow nipple arrangement adapted to receive the opposite end of an inflating tube. Furthermore, capping means may be incorporated to seal off one or more of the apertures.

In a further variation of the first aspect of the present invention, the gland sealing system may further incorporate an automated fluid reservoir, the automated fluid reservoir being in fluid communication with at least one of the at least one inflatable bladders by way of its respective inflating tube. Preferably, the automated fluid reservoir takes the form of a pressurised container.

An external hollow nipple arrangement may surround each aperture and project from the gland follower away from one side of the gland follower opposite the inflatable bladders, each external hollow nipple arrangement adapted to receive a connecting tube at one end, the other end of the connecting tube being attached to the automated fluid reservoir.

The gland sealing system may further incorporate packing that radially surrounds the rotating shaft or sleeve of a rotating shaft. In such an arrangement at least one inflatable bladder take an annular shape so as to surround the packing, thereby ensuring that inflation of the inflatable bladder applies radial pressure to the rotating shaft or shaft sleeve by way of the packing.

Inflation of the at least one inflatable bladder may be achieved pneumatically or hydraulically.

BRIEF DESCRIPTION OF THE SEVERAL VIEWS OF THE DRAWINGS

The invention will now be described, by way of example only, with reference to the accompanying drawings, in which.

DETAILED DESCRIPTION

Figure 2:
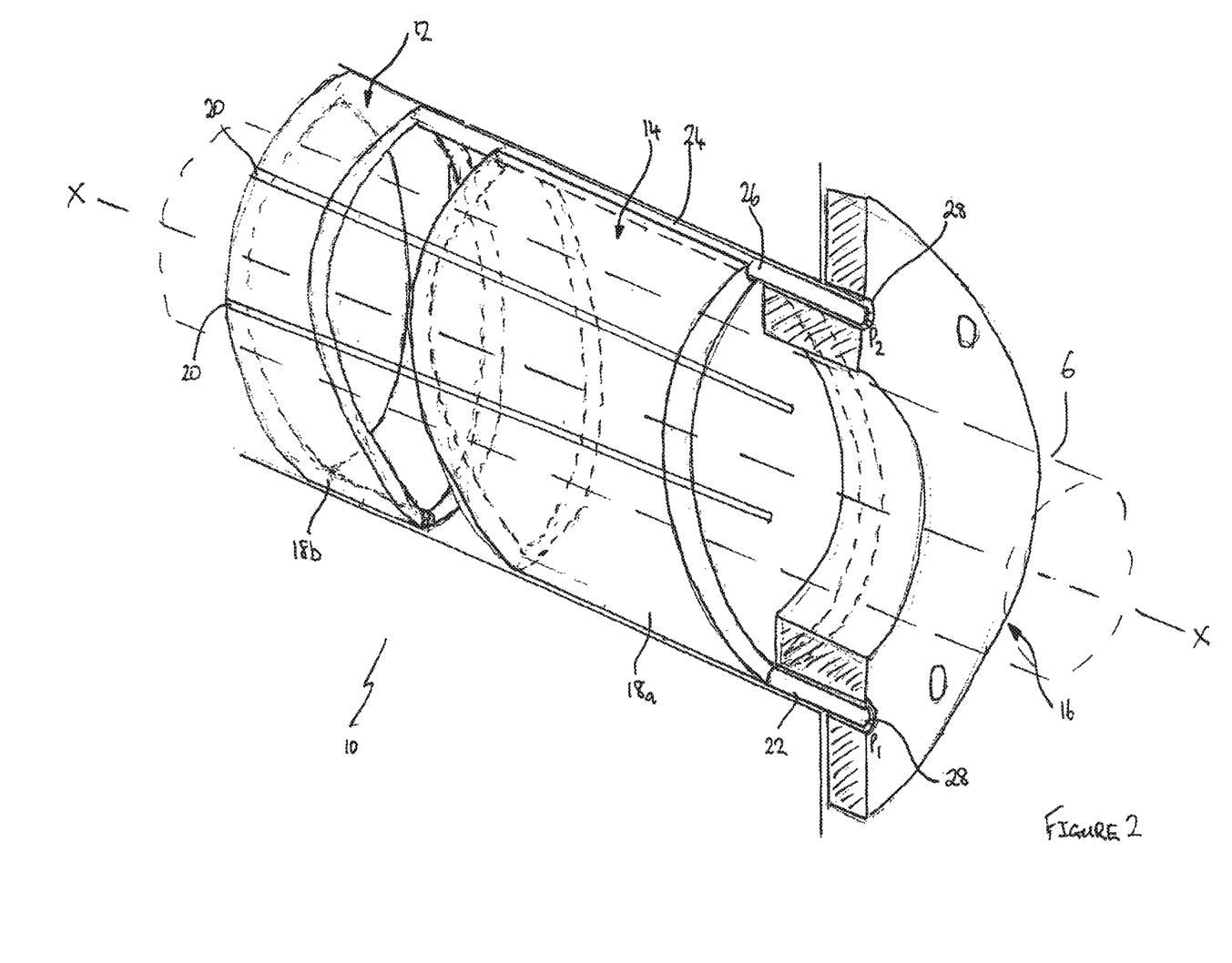
FIG. 2 is a cross-sectional view of a radial pressure adjustable gland sealing system according to a first embodiment of the invention.

In accordance with a first embodiment of the invention there is a radial pressure adjustable gland sealing system 10. The adjustable gland sealing system 10 comprises a first gland portion 12, a second gland portion 14 and a gland follower 16.

Each gland portion 12, 14 is made from two pieces of resilient material connected to each other to form an inflatable annular bladder 18a, 18b respectively. Disposed about the annular bladder 18a, 18b are a plurality of rods 20. Each rod 20 is axially aligned so as to be parallel to a central longitudinal axis X-X of a shaft 6 of a pump (not shown). The rods 20 are sewn to the bladder 18a, 18b so as to assist the bladders 18a, 18b to maintain their longitudinal position during the inflation process.

Annular bladder 18a has a first inflating tube 22. The first inflating tube 22 is in fluid communication with the internal envelope of the inflatable annular bladder 18a. The first inflating tube 22 extends away from the annular bladder 18a in a first direction.

Annular bladder 18b has a second inflating tube 24. The second inflating tube 24 is in fluid communication with the internal envelope of the inflatable annular bladder 18b. The second inflating tube 24 also extends away from the annular bladder 18b in the first direction.

The second inflating tube 24 is significantly longer than the first inflating tube 22. In this manner, the second inflating tube 24 extends past the external periphery 26 of the annular bladder 18a. In this embodiment, the second inflating tube 24 is sewn to the bladder 18a so as to avoid the second inflating tube 24 from unnecessarily hindering inflation of bladder 18a.

The gland follower 16 is of normal construction as is required for the pump with the exception of two apertures 28 provided therein. The apertures 28 are opposite one another for reasons as described below.

This embodiment will now be described in the context of its intended use.

Annular bladder 18a is inserted about the shaft 6 of the pump and arranged such that the attached first inflating tube 22 extends into the gland follower 16 terminating at a first position $P_1$. Annular bladder 18b is then inserted about the shaft 6 of the pump and arranged such that the attached second inflating tube 24 overlays the external periphery 26 of annular bladder 18a and extends into the gland follower 16 terminating at a second position $P_2$. In this embodiment, first position $P_1$ is radially opposite to second position $P_2$. This allows a user to readily identify the annular bladder 18a, 18b inflatable by the associated inflating tube 22, 24.

The first inflating tube 22 is then directed so as to extend through a first aperture 28, while the second inflating tube 24 is directed so as to extend through the other aperture 28. The gland follower 16 is then inserted so as to seal the shaft 6 of the pump in the normal manner as would be known by the person skilled in the art taking into consideration the type and model of pump concerned.

With the gland follower 16 installed, an operator can install the nozzle of a grease gun (not shown) into the extended portion of the first inflating tube 22 as desired. Application of fluid by way of the grease gun from this position causes the fluid to pass through the first inflating tube 22 and into the internal envelope of the annular bladder 18a, causing it to expand radially. The amount of fluid applied by the operator in this manner determines the amount of radial pressure applied to the shaft 6 by annular bladder 18a.

The operator can then apply fluid in the same manner to second inflating tube 24. Application of fluid by way of the grease gun from this position causes the fluid to pass through the second inflating tube 24 into the internal envelope of the annular bladder 18b which then expands radially. As before, the amount of fluid applied by the operator in this manner determines the amount of radial pressure applied to the packing around the shaft 6 by annular bladder 18b.

It is to be noted by the person skilled in the art that as each annular bladder 18a, 18b is constrained by the stuffing box 2 and gland follower 16, the only outlet for the increase in pressure that occurs during inflation is radially against the packing around the shaft sleeve 2. Furthermore, by using fluid to inflate the annular bladders 18a, 18b the radial pressure applied to the packing around the shaft 6 is equal at all points.

Additionally, there is the added advantage that as the means of controlling the radial pressure is by way of the inflating tubes 22, 24 which extend through the gland follower 16, there is no need for an operator to remove a guard to manipulate the gland follower 16 so as to apply the desired level of radial pressure to the shaft 6.

The person skilled in the art should appreciate that the use of two separate annular bladders 18a, 18b allows a gland water distribution ring (not shown) to be installed therebetween.

Figure 3:
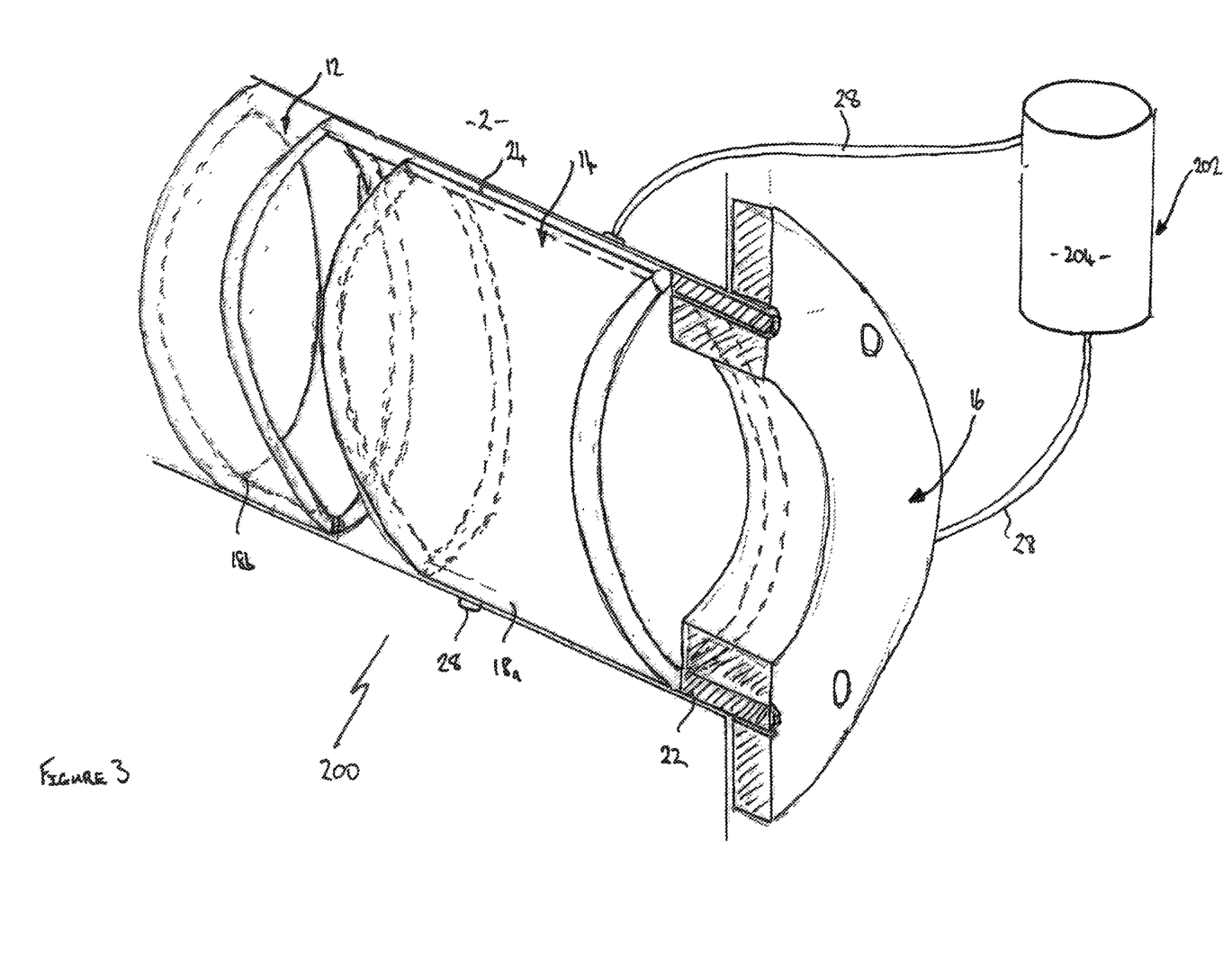
FIG. 3 is a cross-sectional view of a radial pressure adjustable gland sealing system according to a second embodiment of the invention.

In accordance with a second embodiment of the invention, where like numerals reference like parts, there is a radial pressure adjustable gland packing system 200. The adjustable gland packing system 200 is identical to the adjustable gland packing system 10 except as described below.

In this embodiment, the gland follower 16 is of standard construction, i.e. it does not include apertures 28. In their place, the stuffing box 2 has conduits provided therein through which the first inflating tube 22 and second inflating tube 24 pass through. In this embodiment, the first inflating tube 22 and second inflating tube 24 pass through an existing conduit provided in the stuffing box 2 without impeding the flow of gland water.

Each of the first inflating tube 22 and second inflating tube 24 terminates at an external automated reservoir 202. In this embodiment, the automated reservoir 202 takes the form of a pressurised container 204. In this manner the first inflating tube 22 and second inflating tube 24 connect the pressurised container 204 with the annular bladders 18a, 18b while extending through the stuffing box 2.

It should be appreciated that, in use, this embodiment ensures that there is pressure equalisation at all times between the pressurised container 204 and the annular bladders 18a, 18b. Where one or both of the annular bladders 18a, 18b results in pressure loss, the process of pressure equalisation forces fluid from the pressurised container 204 through to the appropriate annular bladder 18a, 18b.

It should be further noted that in this embodiment, the automated reservoir 202 may be located in close proximity to the stuffing box 2, or may be located remote thereto.

Figure 4:
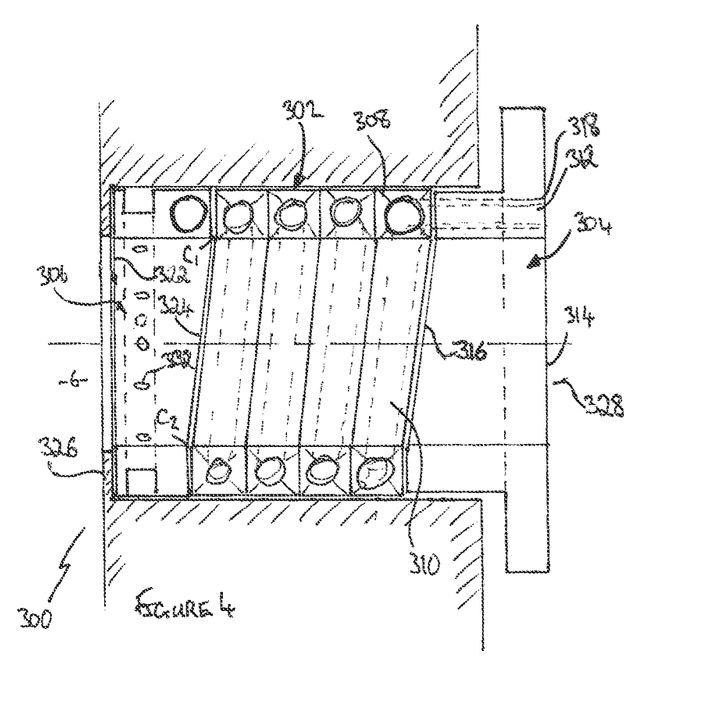
FIG. 4 is a cross-sectional view of a radial pressure adjustable gland sealing system according to a third embodiment of the invention.

In accordance with a third embodiment of the present invention, where like numerals reference like parts, there is a radial pressure adjustable gland sealing system 300.

The adjustable gland sealing system 300 comprises a gland portion 302, a gland follower 304 and a gland water distribution ring 306.

The gland portion 302 is made from a fibrous sheath 308 and an inflatable helical bladder 310. The inflatable helical bladder 310 is contained within the fibrous sheath 308. The inflatable helical bladder 310, in this embodiment, is closed at one end (not shown).

Extending from the helical bladder 310 is an inflating tube 312. The inflating tube 312 is in fluid communication with the internal envelope of the helical bladder 310. When properly installed, the inflating tube 312 extends away from the helical bladder 310 in the direction of the gland follower 304.

The nature of the inflatable helical bladder 306 will be explained in more detail below.

The gland follower 304 is of modified construction compared to the gland follower 16. In this embodiment, the gland follower 304 has an external face 314 and an internal face 316. An aperture 318 extends through the gland follower 304 from the internal face 316 to the external face 314 at a position proximate the outer perimeter 318 of the gland follower 304.

The gland water distribution ring 306 is of modified construction compared to normal gland water distribution rings as may be used with the first embodiment of the invention. The modification manifests itself in the gland water distribution ring 306 having an external face 322 and an internal face 324. The external face 322 is flat.

The internal face 316 of the gland follower 304 and the internal face 324 of the gland water distribution ring 306 are both sloped. The nature and purpose of the sloped internal faces 316, 324 are described in more detail below.

The third embodiment of the invention will now be described in the context of its intended use.

Gland water distribution ring 306 is inserted about the shaft 6 of the pump (not shown) such that the external face 322 abuts restricting shoulder 326 of the stuffing box 2. The flat nature of the external face 322 means that the gland water distribution ring 306 makes contact with the restricting shoulder 326 about its full circumference.

At the same time, this positioning of the gland water distribution ring 306 results in the internal face 324 making contact with the stuffing box 2 at a first side $C_1$ and at a second opposing side $C_2$ such that $C_1$ and $C_2$ represent the minimum and maximum of the slope that is the internal face 320 respectively. Thus, the point of contact $C_2$ is further distant from shaft sleeve opening 328 than point of contact $C_1$.

Helical bladder 310 is then inserted about the shaft 6 of the pump and manipulated until such time as it is positioned adjacent internal face 324. In this position, it is to be noted that the pitch angle of each coil 330 in the helical bladder 310 is complimentary to the angle of the slope of the internal face 324.

The gland follower 304 is then inserted to seal off the helical bladder 310. The nature of the gland follower 304 means that it can only be inserted one way, however, for the avoidance of doubt, proper installation of the gland follower 304 sees the internal face 316 positioned adjacent the helical bladder 310.

As with the gland water distribution ring 306, the pitch angle of each coil 330 in the helical bladder 310 is complimentary to the angle of the slope of the internal face 316. However, in this embodiment, the angle of the slope of the internal face 316 is also complimentary to the angle of the slope of the internal face 324.

In placing the gland follower 304 it is also important to ensure that the aperture 318 is positioned so as to allow the inflating tube 312 to be received therein.

With the gland follower 304 properly installed, to increase the volume of the inflatable helical bladder 310 an operator can install a nozzle of a grease gun (not shown) into the extended area of the inflating tube 312 as desired. Application of fluid by way of the grease gun from this position causes the fluid to pass into the helical bladder 310, causing it to expand radially. The amount of fluid applied by the operator in this manner determines the amount of radial pressure applied to the shaft sleeve 6 by helical bladder 310.

To expand on this, as with the earlier embodiments of the invention 10, 200, the gland portion 302 is constrained in its ability to expand by the stuffing box 2, the gland water distribution ring 306 and the gland follower 304. Thus, any increase in fluid provided to the helical bladder 310 causes the helical bladder 310—and by extension the gland portion 302—to expand radially towards the shaft sleeve 6.

It should be appreciated by the person skilled in the art that there is no reason why this third embodiment of the invention may not be further modified to include the automated reservoir system of the second embodiment.

It is to be appreciated that the inflating tubes 22, 24, 312 can be made from any material as allows for proper inflation of the bladders to which they are connected. However, where the inflating tubes 22, 24, 312 extend into pressurised areas, such inflating tubes 22, 24, 312 either need to be formed from a single material that is capable of withstanding the pressures inherent in the pressurised area, or must comprise two segments—one segment being made from a material that can withstand the pressures inherent in the pressurised area while the other being made from any other suitable material.

While the invention has been described in the context of a pump shaft, there is no reason why the invention cannot be used in any arrangement involving a rotating shaft contained within a static housing.

It should be appreciated by the person skilled in the art that the above invention is not limited to the embodiments described. In particular, the following modifications and improvements may be made without departing from the scope of the present invention:

While the invention has been described in the context of inflation of bladders 18a, 18b, 302 being by way of a grease gun, other fluids could easily be used to inflate the bladders 18a, 18b, 302 including a range of gases, as well as other means of delivering such fluids. Thus, the adjustment of radial pressure can be achieved either pneumatically or hydraulically.

The rods 20 are ideally made from metal or other rigid material. Additionally, the rods may be connected to the annular bladders 18a, 18b by way of other means than a sewn connection. In yet a further arrangement, the rods 20 may be omitted in their entirety.

The system 10, 200, 300 may comprise separate components as described or be integrated into a single unit. For instance, in a single unit configuration, the inflating tubes 22, 24, 312 may be formed around the apertures 28, 318 as part of the gland follower 16, 304.

Figure 5:
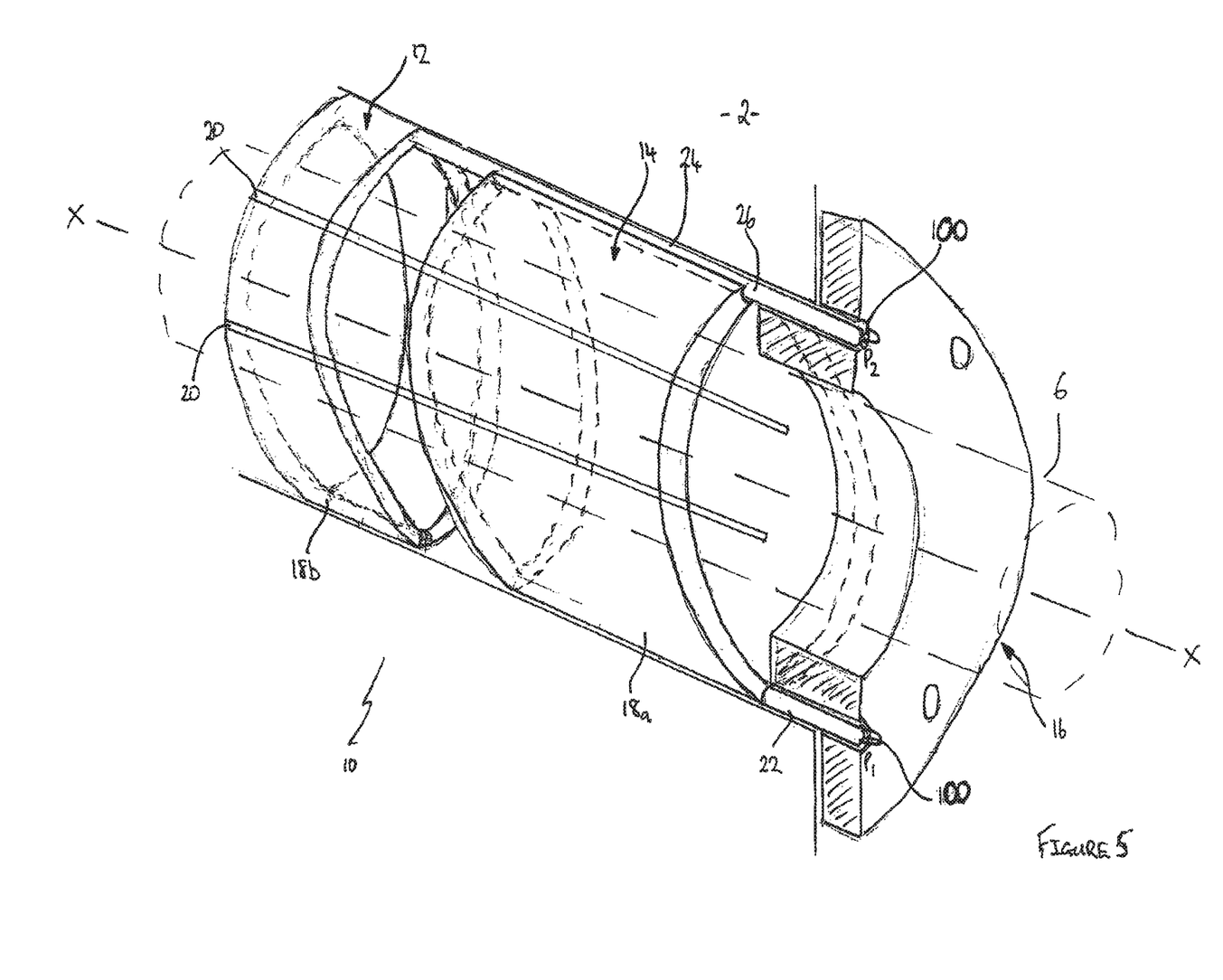
FIG. 5 is a cross-sectional view of a variation of the radial pressure adjustable gland sealing system according to the first embodiment of the invention as shown in FIG. 2.

Apertures 28 may be replaced with hollow nipples 100, the first inflating tube 22 and second inflating tube 24 operable to connect to the hollow nipple 100 rather than extend through the aperture 28. Application of fluid to the first inflating tube 22 or second inflating tube 24 as described above is then by way of the appropriate hollow nipple. This configuration is shown in FIG. 5.

The second embodiment of the invention may be modified so as to use the gland follower 16 of the first embodiment. In such an arrangement, the first inflating tube 22 and second inflating tube 24 may extend through the apertures 28 provided in the gland follower to terminate at the automated reservoir 202.

Alternatively, the first embodiment of the invention may be modified so that the gland follower 16 omits apertures 28. In such a configuration, the first inflating tube 22 and second inflating tube 24 may extend through apertures provided in the stuffing box 2 as described in the second embodiment to facilitate inflation of the annular bladders 18a, 18b.

The second embodiment of the invention may be modified such that the stuffing box 2 is drilled to create one or more apertures specifically for receiving the first inflating tube 22 and second inflating tube 18b.

Apertures 28, or hollow nipples 100, may be provided with a capping arrangement.

In a variation of the second embodiment of the invention described above, the aperture may be replaced with dual-ended hollow nipples (not shown). In such a manner, the first inflating tube 22 and second inflating tube 24 can connect to the hollow nipples 100 on the gland packing side of the gland follower 16, while connecting tubes 206 leading from the pressurised container 204 connect to the hollow nipples 100 on the opposite side of the gland follower 16.

While the invention has been described in the context of two inflatable annular bladders 18a, 18b, there is no reason why a single annular bladder 18 or more than two annular bladders 18 may be used depending on the circumstances.

In other embodiments of the invention, the inflatable annular bladders 18a, 18b may be connected by way of a bridging tube (not shown). The bridging tube replaces the second inflating tube 24. As a result, when fluid has sufficiently inflated inflatable annular bladder 18a, the fluid then travels along the bridging tube to commence inflating of inflatable annular bladder 18b. Furthermore, the invention can be used in the context of multiple annular bladder sets, each annular bladder set comprising a number of connected inflatable annular bladders 18a, 18b.

While the above description of the embodiments allows an operator to determine the annular bladder 18 to be inflated by reason of the position of the aperture 28 in the gland follower 16, there is no reason why other means of identifying what aperture 28 relates to which annular bladder 18 could not be used. For instance, the apertures 28 may be appropriately labelled or colour coded.

The apertures 28, including apertures 28 forming the external end of a conduit, may be shaped or otherwise configured to allow the nozzle of a grease gun to be sealingly engaged therewith.

The helical bladder 310 may be designed such that it tapers at one or each end. In such an arrangement, the need to modify the gland follower 304 and/or gland water distribution ring 306 to include a sloping internal face 316, 324 may no longer be necessary.

In a further variation of the third embodiment described above, the gland water distribution ring 306 may have a terminating recess 332 as shown in FIG. 4. When used with a helical bladder 308 which has open ends, the terminating recess 332 operates to seal the helical bladder 308 at one end (the other end transitioning into inflating tube 310).

In order to properly handle the pressure inherent in pressurised areas of the operating environment, the inflating tube 22, 24, 312 may connect to, or terminate at, a pressure thread.

The inflating tubes 22, 24, 312 may terminate in a grease nipple. Alternatively, the inflating tubes 22, 24, 312 may terminate in a pressure retaining non-return valve.

The fibrous sheath 308 may be replaced with a sleeve of resilient material.

In further variations of the present invention, each inflating tube 22, 24, 312 may be in fluid communication with its own automated reservoir 202. In this manner, each automated reservoir 202 can be used to separately determine the amount of radial pressure to be applied by the associated inflatable bladder. Alternatively, a single automated reservoir 202 may be in fluid communication with the inflating tubes 22, 24, 312 of multiple gland sealing systems 10, 200, 300.

Figure 6:
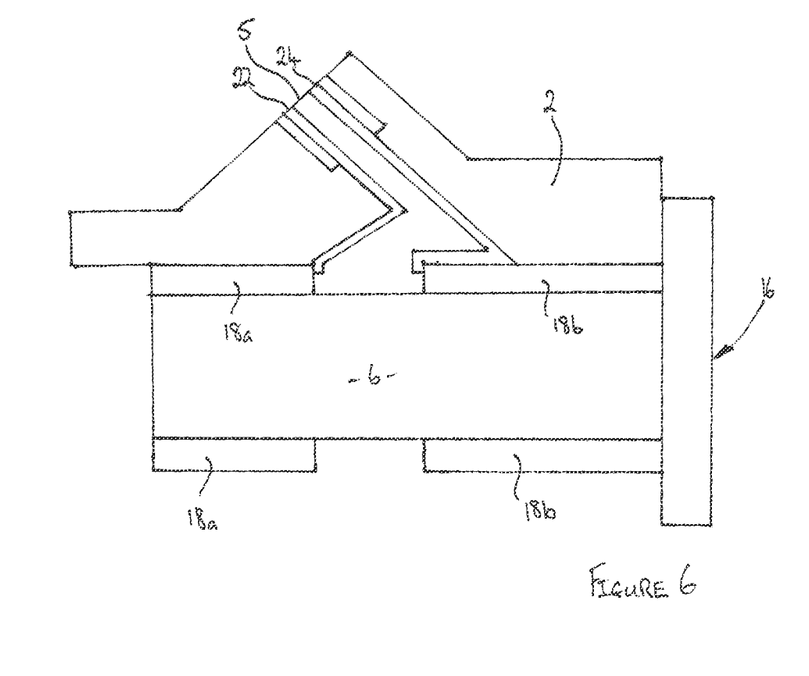
FIG. 6 is a schematic representation of a variation of the radial pressure adjustable sealing system according to the second embodiment of the invention as shown in FIG. 3.

In further variations, either of inflating tube 22, 24 may pass through an existing conduit ordinarily provided in the stuffing box 2, while the other inflating tube 22, 24 passes through a custom conduit created in the stuffing box 2 to specifically facilitate the inflating tube 22, 24. Regardless, it is important that the inflating tubes 22, 24 do not impede the flow of gland water to its intended location(s). Furthermore, in both situations, the external end of the conduit acts as aperture 28. This configuration is shown in more detail in FIG. 6.

In a further variation of the invention, the gland sealing system 10, 200, or 300 may be contained in a housing that is bolted to the stuffing box 2 using existing threaded holes in the stuffing box 2 normally used to attach the gland follower 16, 304, as attachment points. In this configuration, the inflating tubes 22, 24 will exit the assembly via apertures provided in the end housing that replaces the gland follower 16, 304, to allow for fluid communication with the desired inflatable annular bladder 18a, 18b or inflatable helical bladder 310 (as appropriate).

While reference has been made to use of the invention in the context of a grease gun, it should be appreciated that the invention can be used with any form of fluid pressurising injector that provides fluid to the annular bladders 18 by way of a non-return valve attached to the end of each inflation tube 22, 24, 312.

Figure 7:
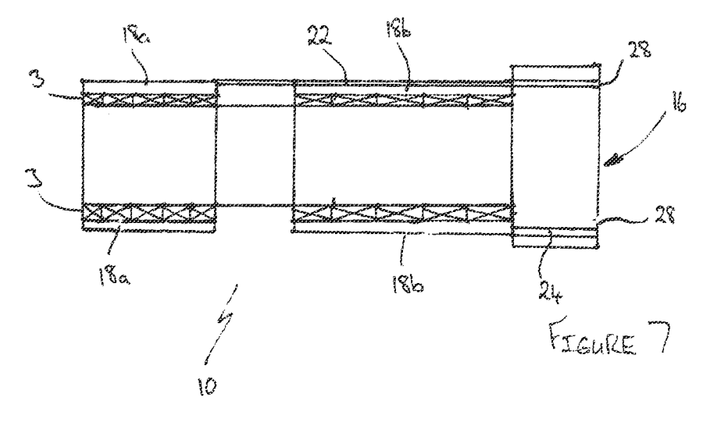
FIG. 7 is a schematic representation of a variation of the radial pressure adjustable gland sealing system according to the first embodiment of the invention as shown in FIG. 2.
Figure 8:
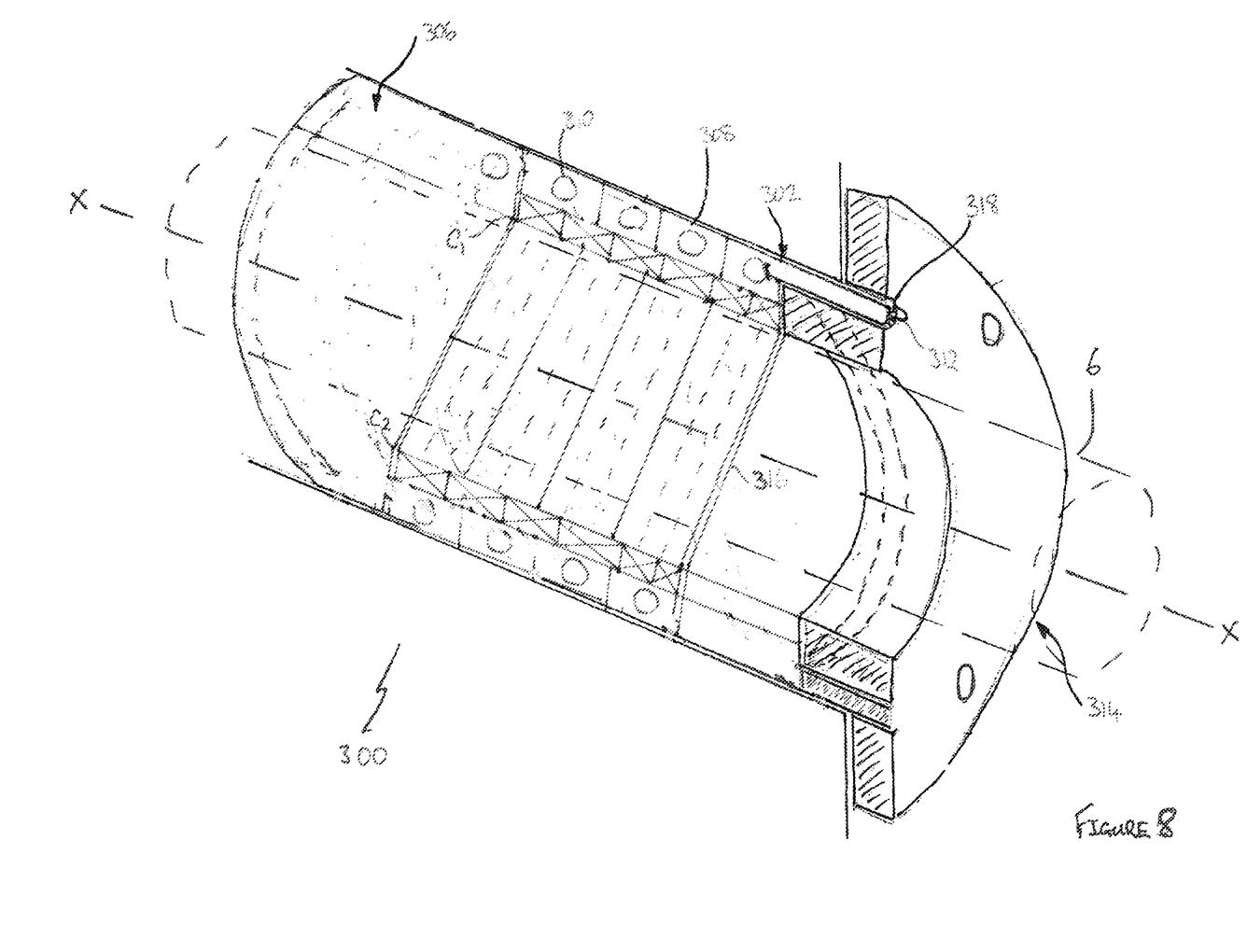
FIG. 8 is a cross-sectional view of a variation of the radial pressure adjustable gland sealing system according to the third embodiment of the invention.

While the invention has been described in the context of the annular bladders 18 potentially taking over the role of packing to apply pressure direct to the shaft 6, in other arrangements, the annular bladders 18 may be separate to, but working in combination with the packing. One preferred such arrangement is for the packing to surround the shaft 6 as per normal use, but with the annular bladders 18 operating to surround the packing. Thus, the adjustment of pressure within the annular bladders 18 results in adjustment of radial pressure to the packing and, in turn, adjustment of radial pressure to the shaft 6. This configuration is shown in more detail in FIG. 7.

It should be further appreciated by the person skilled in the art that the invention is not limited to the embodiments described above. Additions or modifications described, where not mutually exclusive, can be combined to form yet further embodiments that are considered to be within the scope of the present invention.

We claim:

1. A radial pressure adjustable gland sealing system for use with a rotating shaft or a sleeve of a rotating shaft comprising:
    an inflatable bladder operable to surround the rotating shaft or the sleeve of the rotating shaft, the inflatable bladder being helical in shape;
    at least one inflating tube, one end of each inflating tube being in fluid communication with an internal envelope of one of the at least one inflatable bladder;
    a gland water distribution ring having a sloped internal face; and
    a gland follower having a sloped internal face, where the sloped internal face of the gland water distribution ring is complimentary to the sloped internal face of the gland follower and complimentary to a pitch angle of each coil of the inflatable bladder and where an opposite end of each inflating tube is connected, or extends, to a location outside of a static housing in which the rotating shaft is housed, such that a level of inflation of each inflatable bladder can be adjusted by way of its respective inflating tube and thereby adjust the level of radial pressure exerted on the rotating shaft or the sleeve of a rotating shaft.

2. A gland sealing system according to claim 1, where the gland follower has at least one aperture provided therein, each inflating tube operable to connect to one of the at least one apertures or extend therethrough.

3. A gland sealing system according to claim 1, where at least one of the at least one inflating tubes is connected, or extends to a location outside of the static housing by way of conduits provided in a stuffing box that surrounds the rotating shaft or the sleeve of a rotating shaft.

4. A gland sealing system according to claim 1, where the inflatable bladder is contained within a fibrous sleeve.

5. A gland sealing system according to claim 1, where the inflatable bladder has an open end, being opposite an end which transitions into the inflating tube and where the gland water distribution ring incorporates a terminating recess, the terminating recess operable to receive the open end and thereby seal the inflatable bladder at the open end.

6. A gland sealing system according to claim 2, where each aperture incorporates a pressurised retaining non-return valve adapted to engage with a nozzle of a fluid pressurising injector.

7. A gland sealing system according to claim 1, further comprising one or more caps, each cap operable to seal off one or more of the apertures.

8. A gland sealing system according to claim 1, further comprising an automated fluid reservoir, the automated fluid reservoir being in fluid communication with at least one of the at least one inflatable bladders by way of its respective inflating tube.

9. A gland sealing system according to claim 8, where the automated fluid reservoir takes the form of a pressurised container.

10. A gland sealing system according to claim 1, further comprising a packing that radially surrounds the rotating shaft or the sleeve of a rotating shaft and where the inflatable bladder surrounds the packing, such that inflation of the inflatable bladder applies radial pressure to the rotating shaft, or the sleeve of a rotating shaft, by way of the packing.

\* \* \* \* \*